(12) United States Patent
Hedlund et al.

(10) Patent No.: US 10,598,549 B2
(45) Date of Patent: Mar. 24, 2020

(54) WIRELESS TEMPERATURE PROBE

(71) Applicant: The Vollrath Company, L.L.C., Sheboygan, WI (US)

(72) Inventors: Brian Hedlund, Kohler, WI (US); Jill Hundley, Sheboygan, WI (US); Rebecca J. Schreiber-Pethan, Sheboygan, WI (US); Peter Roever, West Bend, WI (US)

(73) Assignee: The Vollrath Company, L.L.C., Sheboygan, WI (US)

( * ) Notice: Subject to any disclaimer, the term of this patent is extended or adjusted under 35 U.S.C. 154(b) by 33 days.

(21) Appl. No.: 15/668,195

(22) Filed: Aug. 3, 2017

(65) Prior Publication Data

US 2018/0038737 A1 Feb. 8, 2018

Related U.S. Application Data

(60) Provisional application No. 62/371,156, filed on Aug. 4, 2016.

(51) Int. Cl.
| | |
|---|---|
| *G01K 13/00* | (2006.01) |
| *G01J 5/02* | (2006.01) |
| *G01J 5/00* | (2006.01) |
| *A47J 45/06* | (2006.01) |
| *G01K 1/02* | (2006.01) |

(52) U.S. Cl.
CPC ............. *G01J 5/025* (2013.01); *A47J 45/068* (2013.01); *G01J 5/0003* (2013.01); *G01J 5/0205* (2013.01); *G01K 1/024* (2013.01); *G01K 13/00* (2013.01); *G01K 2207/04* (2013.01); *G01K 2207/06* (2013.01)

(58) Field of Classification Search
CPC .. G01J 5/00; G01K 1/00; G01K 13/00; G01K 11/00; G01K 1/026; G01K 1/024; G01K 7/00
See application file for complete search history.

(56) References Cited

U.S. PATENT DOCUMENTS

| | | | |
|---|---|---|---|
| 3,742,178 | A | 6/1973 | Harnden, Jr. |
| 4,230,731 | A | 10/1980 | Tyler |
| 4,340,796 | A | 7/1982 | Yamaguchi et al. |
| 4,377,733 | A | 3/1983 | Yamaguchi et al. |

(Continued)

FOREIGN PATENT DOCUMENTS

| | | | |
|---|---|---|---|
| CN | 202141092 U | * | 1/2012 |
| DE | 20203566 U1 | * | 5/2002 |

(Continued)

OTHER PUBLICATIONS

Search Report for International Application No. PCT/US2017/045286, dated Oct. 13, 2017, 9 pages.

(Continued)

*Primary Examiner* — Gail Kaplan Verbitsky
(74) *Attorney, Agent, or Firm* — Foley & Lardner LLP

(57) ABSTRACT

A probe used with food preparation, rethermalization, storage, transportation, and/or service includes a body configured to be immersed in a foodstuff, one or more sensors configured to collect data including the temperature of the foodstuff, and a wireless device configured to transmit data collected by the one or more sensors to food equipment to control the heat provided to the foodstuff.

11 Claims, 8 Drawing Sheets

SECTION A-A-A

(56) References Cited

U.S. PATENT DOCUMENTS

| | | | |
|---|---|---|---|
| 4,399,824 A * | 8/1983 | Davidson | A61B 5/01 374/163 |
| 4,475,024 A | 10/1984 | Tateda | |
| 4,518,839 A | 5/1985 | Taguchi et al. | |
| 4,587,406 A | 5/1986 | Andre | |
| 4,626,662 A | 12/1986 | Woolf | |
| 5,373,608 A * | 12/1994 | Welch | A47J 45/071 16/425 |
| 5,575,563 A | 11/1996 | Chiu et al. | |
| 5,620,255 A * | 4/1997 | Cook, III | A47J 43/28 374/141 |
| 5,746,114 A | 5/1998 | Harris | |
| 5,934,181 A * | 8/1999 | Adamczewski | A47J 45/068 99/342 |
| 5,951,900 A | 9/1999 | Smrke | |
| 5,983,783 A * | 11/1999 | Archard | A47J 43/283 30/322 |
| D422,224 S | 4/2000 | Yu | |
| D424,954 S | 5/2000 | Chambers | |
| D427,025 S | 6/2000 | Lee | |
| 6,080,972 A * | 6/2000 | May | A21B 1/02 219/486 |
| D439,809 S | 4/2001 | Ming et al. | |
| D441,669 S | 5/2001 | Lam | |
| D445,654 S | 7/2001 | Yu | |
| D456,285 S | 4/2002 | Lee | |
| D456,286 S | 4/2002 | Yu | |
| 6,539,842 B1 | 4/2003 | Chapman et al. | |
| D477,505 S | 7/2003 | Devlin et al. | |
| D479,476 S | 9/2003 | Devlin et al. | |
| D479,807 S | 9/2003 | Norcross et al. | |
| D479,958 S | 9/2003 | Hsu | |
| 6,698,923 B2 | 3/2004 | Bedetti et al. | |
| 6,850,861 B1 | 2/2005 | Faiola et al. | |
| 6,953,919 B2 | 10/2005 | Clothier | |
| 7,075,442 B2 | 7/2006 | Lion et al. | |
| 7,080,593 B1 | 7/2006 | Frankel | |
| 7,165,489 B1 * | 1/2007 | Fernandez | A47J 27/02 126/373.1 |
| D549,057 S | 8/2007 | Sanoner | |
| D555,436 S | 11/2007 | Slothower | |
| 7,322,278 B2 * | 1/2008 | Mercer | A47J 37/1266 99/331 |
| 7,337,712 B1 * | 3/2008 | Wang | A47J 43/22 210/360.1 |
| 7,381,933 B2 | 6/2008 | Cristiani | |
| 7,409,765 B2 * | 8/2008 | So | A47J 45/068 30/123 |
| 7,473,872 B2 | 1/2009 | Takimoto | |
| 7,605,349 B2 | 10/2009 | Gaynor et al. | |
| 7,964,824 B2 | 6/2011 | Moon | |
| RE42,513 E | 7/2011 | Clothier | |
| 8,188,409 B2 | 5/2012 | Baier | |
| 8,240,914 B1 * | 8/2012 | Chapman | G01K 1/024 340/870.17 |
| 8,274,392 B2 | 9/2012 | Goltenboth | |
| 8,353,423 B2 * | 1/2013 | McIntyre | A47J 45/071 220/573.1 |
| 8,398,303 B2 | 3/2013 | Kuhn | |
| 8,556,502 B2 * | 10/2013 | Austen | G01K 1/026 374/110 |
| 8,598,497 B2 | 12/2013 | Broders et al. | |
| D698,211 S | 1/2014 | Biever | |
| 8,754,351 B2 | 6/2014 | England et al. | |
| 8,783,947 B2 * | 7/2014 | Ferron | A47J 45/068 220/756 |
| 9,006,622 B2 | 4/2015 | Beverly et al. | |
| 9,060,212 B2 | 6/2015 | Loic | |
| 9,131,537 B2 | 9/2015 | Broders et al. | |
| 9,191,998 B2 | 11/2015 | Hegedis et al. | |
| 9,215,758 B2 | 12/2015 | Imura | |
| 9,439,530 B2 | 9/2016 | Logan et al. | |
| 9,477,962 B2 | 10/2016 | Worrall et al. | |
| 9,648,975 B2 | 5/2017 | Imura | |
| 10,088,371 B2 * | 10/2018 | Kaiser | A47J 27/62 |
| 2002/0009121 A1 | 1/2002 | Siu | |
| 2002/0124737 A1 | 9/2002 | Bedetti et al. | |
| 2002/0181542 A1 | 12/2002 | Lee | |
| 2004/0016348 A1 | 1/2004 | Sharpe | |
| 2005/0011367 A1 | 1/2005 | Crow | |
| 2005/0242086 A1 | 11/2005 | Imura | |
| 2006/0086258 A1 | 4/2006 | Sharpe | |
| 2006/0185523 A1 * | 8/2006 | Wiedemann | A47J 27/62 99/331 |
| 2007/0095215 A1 | 5/2007 | Ho et al. | |
| 2009/0096617 A1 * | 4/2009 | Purcell | G01K 1/022 340/584 |
| 2009/0188396 A1 | 7/2009 | Hofmann et al. | |
| 2011/0044370 A1 | 2/2011 | Schochet et al. | |
| 2012/0000903 A1 * | 1/2012 | Baarman | A47J 27/002 219/620 |
| 2013/0305933 A1 * | 11/2013 | Heidrich | A47J 36/321 99/331 |
| 2014/0098835 A1 | 4/2014 | Herzog et al. | |
| 2014/0292536 A1 | 10/2014 | Barth et al. | |
| 2014/0348987 A1 | 11/2014 | Cheng et al. | |
| 2015/0008216 A1 | 1/2015 | Pippia | |
| 2015/0037471 A1 | 2/2015 | Fung et al. | |
| 2015/0064314 A1 | 3/2015 | Manuel et al. | |
| 2015/0114962 A1 * | 4/2015 | Kaiser | A47J 27/62 220/212 |
| 2015/0149120 A1 | 5/2015 | Burkhardt et al. | |
| 2015/0208845 A1 | 7/2015 | Robbins et al. | |
| 2015/0208858 A1 | 7/2015 | Robbins et al. | |
| 2015/0233573 A1 * | 8/2015 | Ke | F22B 1/285 392/402 |
| 2015/0282661 A1 | 10/2015 | Wu | |
| 2015/0300887 A1 | 10/2015 | Mandava et al. | |
| 2015/0312964 A1 | 10/2015 | Sorenson et al. | |
| 2015/0341579 A1 | 11/2015 | Kobayashi et al. | |
| 2015/0342388 A1 | 12/2015 | Wu | |
| 2015/0342389 A1 | 12/2015 | Wu | |
| 2015/0342390 A1 | 12/2015 | Wu | |
| 2015/0342392 A1 | 12/2015 | Wu | |
| 2015/0374161 A1 * | 12/2015 | Bilet | A47J 27/16 99/330 |
| 2016/0037956 A1 | 2/2016 | Wu | |
| 2016/0051078 A1 | 2/2016 | Jenkins et al. | |
| 2016/0067649 A1 | 3/2016 | Sevier | |
| 2016/0088685 A1 | 3/2016 | Henke et al. | |
| 2016/0109301 A1 * | 4/2016 | Thompson | G01K 7/02 374/179 |
| 2016/0377490 A1 * | 12/2016 | Nivala | G01K 13/00 374/155 |
| 2017/0013681 A1 | 1/2017 | Lee et al. | |
| 2017/0099990 A1 | 4/2017 | Magnouloux et al. | |
| 2017/0099995 A1 | 4/2017 | Magnouloux | |
| 2017/0138797 A1 | 5/2017 | Brown et al. | |
| 2017/0150841 A1 * | 6/2017 | Johncock | A47J 27/62 |
| 2017/0244820 A1 * | 8/2017 | Schriefer | H04M 1/2474 |
| 2017/0244828 A1 * | 8/2017 | Chan | H04M 1/0254 |
| 2018/0116457 A1 * | 5/2018 | Mills | A47J 37/10 |
| 2019/0172323 A1 * | 6/2019 | Deng | G08B 5/224 |

FOREIGN PATENT DOCUMENTS

| | | | |
|---|---|---|---|
| JP | 2001221791 A * | 8/2001 | |
| JP | 3370305 B2 * | 1/2003 | |
| KR | 20080012157 A * | 2/2008 | |
| KR | 2015012000 A * | 2/2015 | |
| WO | WO 2016/138555 A1 | 9/2016 | |

OTHER PUBLICATIONS

Wireless Food Temperature Probes Product Sheet, https://www.bapihvac.com/product/wireless-food-temperature-probes/?combo=#configure, retrieved May 24, 2017, 3 pages.

* cited by examiner

SECTION A-A-A

SECTION B-B

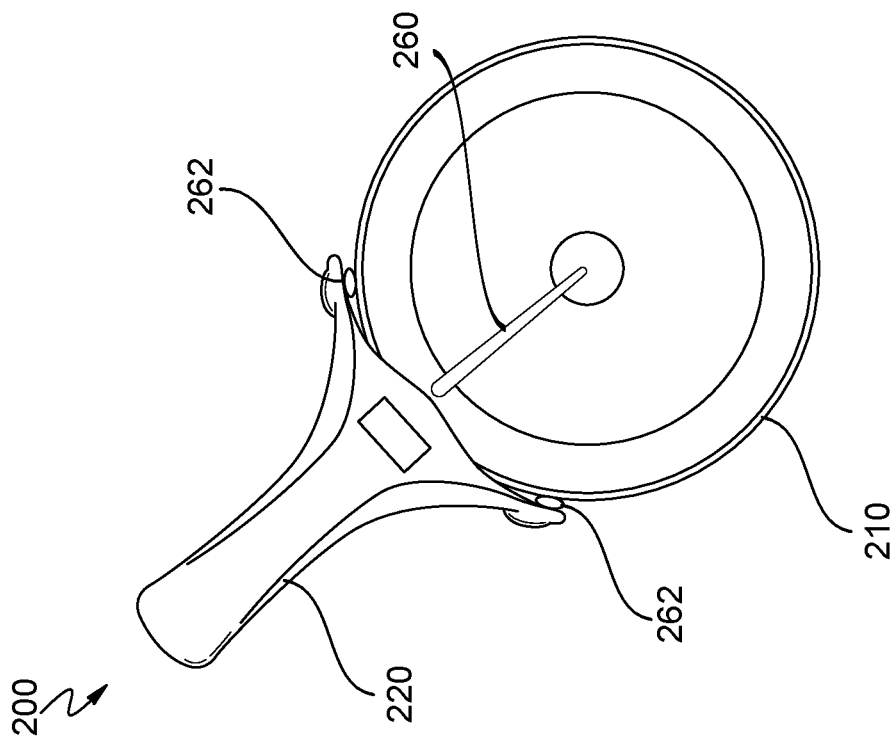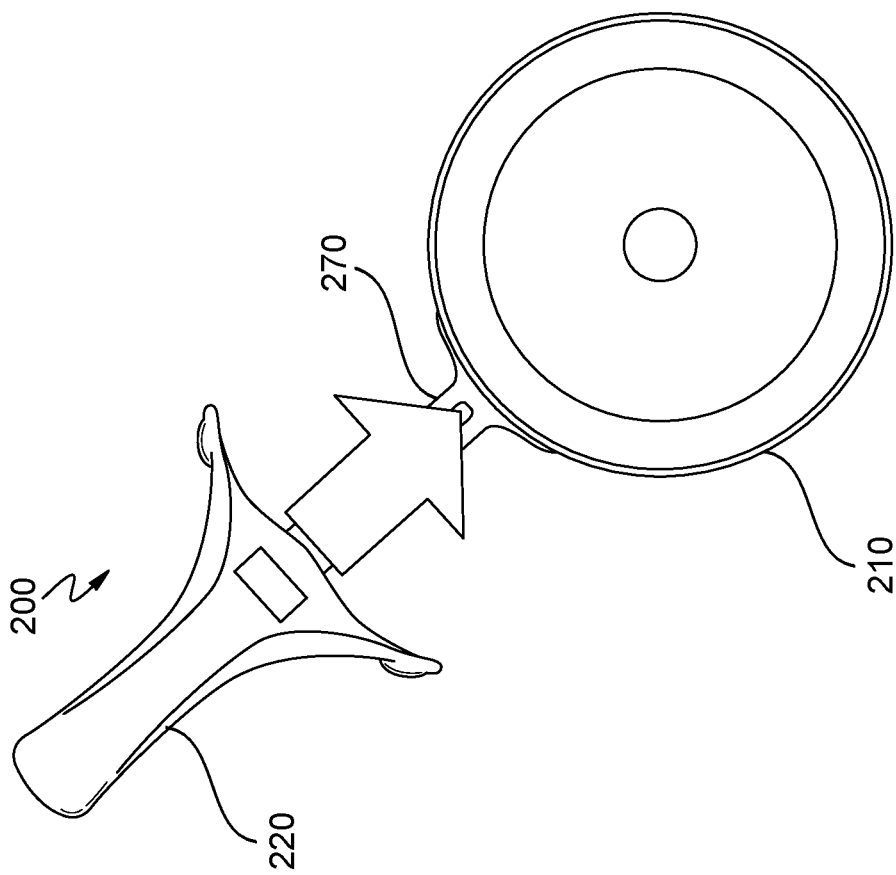

WIRELESS TEMPERATURE PROBE

CROSS-REFERENCE TO RELATED PATENT APPLICATION

This application claims the benefit of and priority to U.S. Patent Application No. 62/371,156 filed Aug. 4, 2016, the entire disclosure of which is incorporated by reference herein.

BACKGROUND

The present disclosure relates generally to the field of food service equipment. More specifically, the present disclosure relates to an immersible probe configured to communicate wirelessly with food equipment to monitor and control a process related to the preparation, storage, or service of food.

SUMMARY

One embodiment of the invention relates to a probe used with food preparation, rethermalization, storage, transportation, and/or service. The probe includes a body configured to be immersed in a foodstuff, one or more sensors configured to collect data including the temperature of the foodstuff, and a wireless device configured to transmit data collected by the one or more sensors to food equipment to control the heat provided to the foodstuff.

Another embodiment of the invention relates to a cooking appliance used in food preparation. The cooking appliance includes a cooking vessel configured to retain a foodstuff during a cooking process and a detachable handle that is detachably coupled to the cooking vessel. The handle includes a temperature sensor unit configured to measure a temperature of the cooking vessel and a temperature of foodstuff retained within the cooking vessel. The handle further includes a transmitter configured to transmit temperature data measured by the temperature sensor unit to a receiver via wireless messages.

Yet another embodiment of the invention relates to a utensil used with food preparation, rethermalization, storage, transportation, and/or service. The utensil includes a sensing utensil portion configured to be in contact with a foodstuff. The sensing utensil portion includes a sensor configured to measure the temperature of the foodstuff and a wireless device configured to transmit data collected by the sensor to at least one of a receiver, a mobile device, or a cloud gateway. The receiver, mobile device, or cloud gateway is configured to control the heat provided to the foodstuff via cooking equipment. The utensil further includes a handle portion detachably coupled to the sensing utensil portion.

BRIEF DESCRIPTION OF THE DRAWINGS

The invention will become more fully understood from the following detailed description, taken in conjunction with the accompanying drawings, in which:

FIGS. 8-9 are perspective views of an assembly procedure for the cooking appliance of FIG. 6, according exemplary embodiments.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
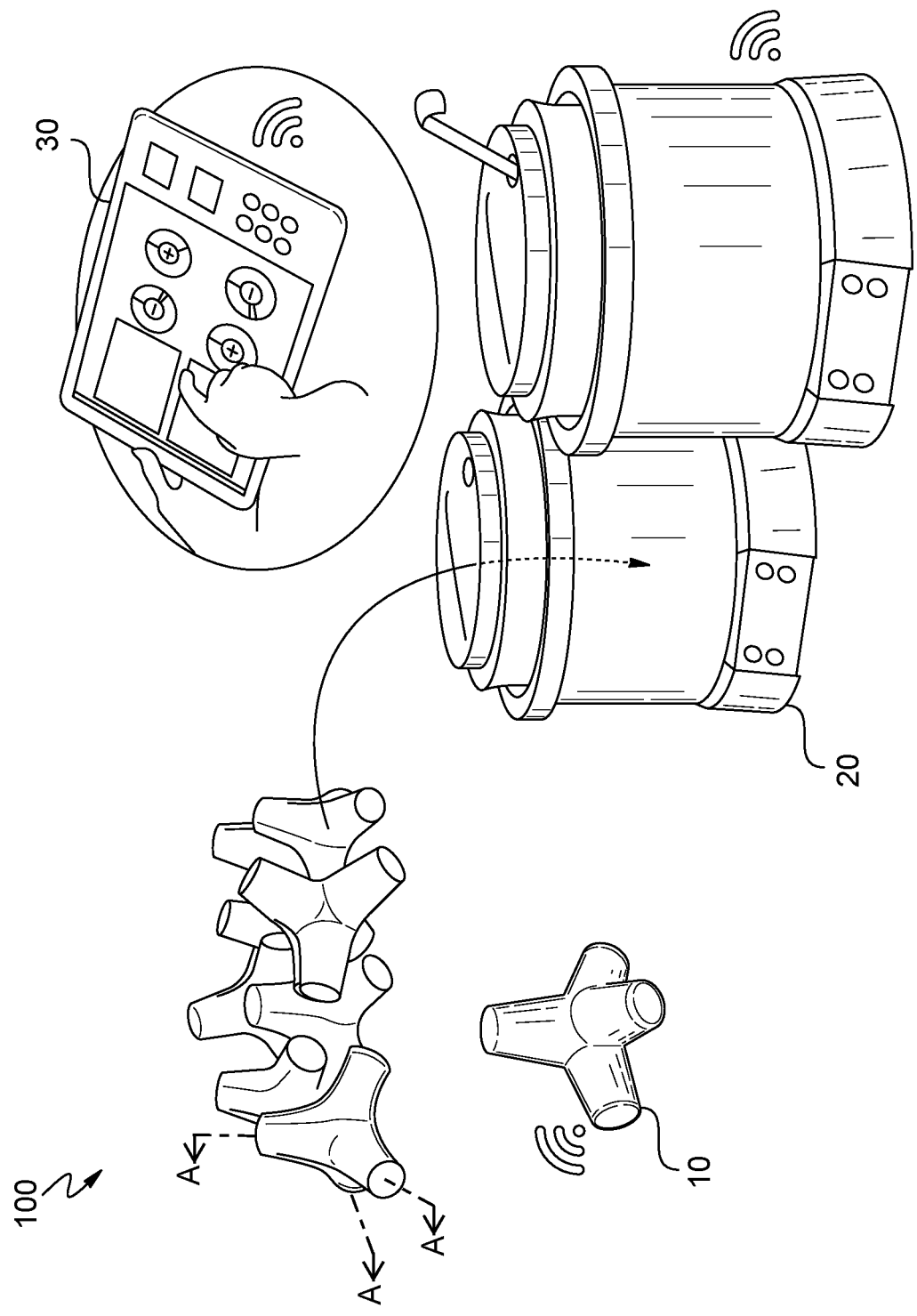
FIG. 1 is a perspective view of a wireless probe food preparation system, according to an exemplary embodiment.

Referring to FIG. 1, a wireless probe food preparation system 100 is shown according to an exemplary embodiment. Food preparation system 100 includes, but is not limited to, a wireless probe 10, food equipment 20, and a wireless control device 30. In addition to food preparation, system 100 may be used for any process related to food, including rethermalization, storage, transportation, service, or other activities involving the heating, monitoring, or control of the food where data or other inputs would be helpful.

Figure 2:
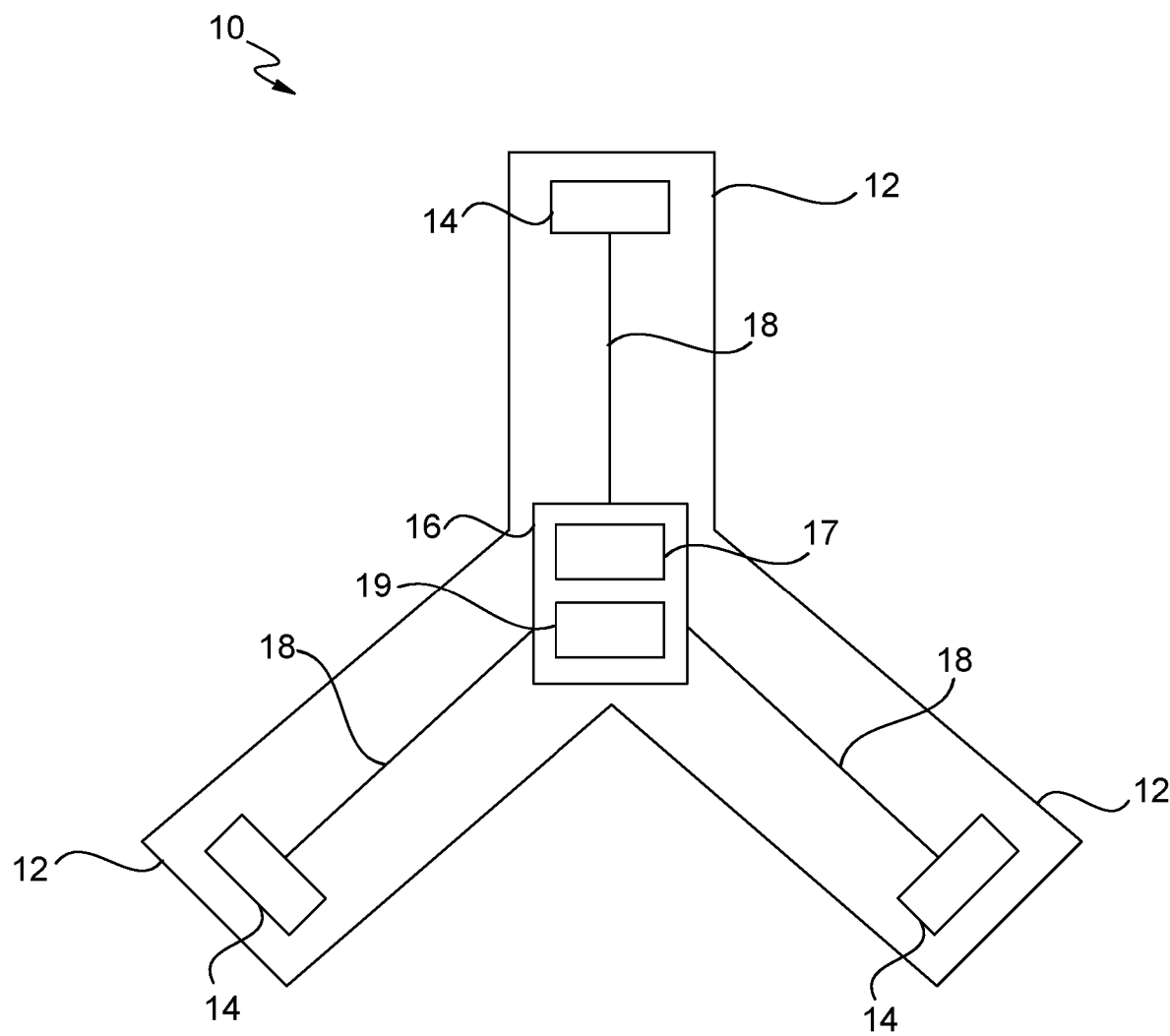
FIG. 2 is an offset sectional view of a wireless probe used in the wireless probe food preparation system of FIG. 1, according to an exemplary embodiment.

Referring now to FIG. 2, according to an exemplary embodiment, wireless probe 10 measures the temperature of a foodstuff while the probe is immersed in the foodstuff. To accomplish this measurement, wireless probe 10 contains at least one sensor 14 within the body of the probe configured to measure temperature. Wireless probe 10 may have any desired geometry, so long as the geometry houses the desired number of sensors 14. In an exemplary embodiment, the probe is shaped so as to not resemble a foodstuff. For example, as shown in FIGS. 1-2, probe 10 contains a plurality of arms (shown as four cylindrically-shaped arms 12) extending from a central point or hub. In some embodiments, each of the four arms 12 contains a sensor 14. Wireless probe 10 may additionally be any desired size, so long as the size prevents accidental ingestion. For example, wireless probe 10 may be around the size of a tennis ball.

In an exemplary embodiment, the measurements of the sensors 14 may be combined via any suitable statistical method to result in a mean temperature reading of the foodstuff. In addition, sensors 14 may be configured to measure other properties in addition to, or besides temperature. For example, these properties may include, but are not limited to, the amount of time elapsed in a food preparation process, the weight of a foodstuff, the viscosity of a foodstuff, a humidity level, or a level of foodstuff contained in food equipment 20 (e.g., so that a user handling the foodstuff knows when refilling is necessary). Sensors 14 may be further configured to detect the presence of a gas (e.g., oxygen, ethylene, or any other gas detrimental to the preservation of food) and the location of the probe (to assist in pairing a probe 10 with food equipment 20 via RFID chips, see below).

In some embodiments, wireless probe 10 further contains an electronics unit 16. Electronics unit 16 is shown to include, among other components, a memory device 17 and a wireless transmitter device 19. Memory device 17 may be one or more devices (e.g., RAM, ROM, Flash memory, hard disk storage) for storing data received from sensors 14 and/or computer code for completing and/or facilitating various processes. Data may be received from sensors 14 via any suitable wired or wireless means, as indicated by reference 18. Memory device 17 may be or include non-transient volatile memory, non-volatile memory, and non-transitory computer storage media. Memory device 17 may also include database components, object code components, script components, or any other type of information structure for supporting the various activities and information structures described herein. In some embodiments, memory device 17 is communicably coupled to a processor and includes computer code or instructions for executing a process.

Still referring to FIG. 2, wireless transmitter device 19 is configured to transmit data collected by the sensors 14 to food equipment 20 and wireless control device 30. In an exemplary embodiment, the wireless transmitter device 19 is configured to transmit data using Bluetooth protocols. In other embodiments, wireless transmitter device 19 is configured to transmit data using a different wireless protocol, including RFID, or near field communication. In one embodiment, the wireless transmitter device 19 may be an RFID chip or other device configured to permit the probe to be paired with a particular piece or component of food equipment 20, or a portion of a food equipment (e.g., one steam table within a multi-well steam table unit). For example, when the wireless transmitter device 19 and equipment 20 are paired and the probe 10 is moved within a certain distance of the equipment 20, the equipment 20 may be configured to initiate or modify a heating process.

The sensors 14, memory device 17, and wireless transmitter device 19 of wireless probe 10 may be powered through various means. In an exemplary embodiment, probe 10 contains a non-rechargeable battery housed in electronics unit 16, which may be accessed and replaced through a battery compartment. In other embodiments, electronics unit 16 contains a rechargeable battery (e.g., a lithium-ion battery). In these embodiments, the rechargeable battery may be recharged through the use of a plug-in power cord, or through the use of a wireless charging mat or device.

Wireless probe 10 is configured to communicate wirelessly with food equipment 20. As shown in FIG. 1, food equipment 20 is depicted as a rethermalizing kettle for serving soup. In this embodiment, the probe 10 may transmit temperature or time data to the kettle 20 in order to maintain the soup at a desired temperature, or to turn the kettle 20 off once a certain heating period has elapsed. However, in various embodiments and as further described below, food equipment 20 may be any device or apparatus configured to assist in the preparation, rethermalization, storage, transportation, and service of food. For example, food equipment 20 includes, but is not limited to, a soup kettle, an induction cooker, an induction range, a steam table or tray, a chafing dish, or a food storage container.

Again referring to FIG. 1, system 100 is further shown to include a wireless control device 30. Wireless control device 30 may be configured to receive sensor data transmitted via wireless transmitter device 19 from wireless probe 10 in order to monitor or control a preparation and/or cooking process. For example, after receiving a temperature measurement from probe 10, a user may issue a command from wireless control device 30 to food equipment 20 to modify a temperature setpoint or programmed cook time. The wireless control device may be incorporated in the food service equipment. In an exemplary embodiment, wireless control device 30 is a mobile device (e.g., a smartphone, a tablet). In other embodiments, wireless control device 30 is a unit specifically configured to control a particular type of food equipment 20, or a website configured to act as a gateway to a remote data storage facility (i.e., a cloud service). As the wireless control device 30 receives data from the probe 10, it may make adjustments to the heating of the foodstuffs (e.g., increasing heat input if the temperature detected by the sensors fall below a set-level; decreasing heat input if the temperature detected by the sensors raises above a set level), providing a report or alarm (e.g., at certain temperature levels or elapsed time), or other adjustments related to the food.

In some embodiments, probe 10 continuously transmits data to wireless control device 30. When the data exceeds a certain threshold (e.g., when the measured temperature exceeds a certain value) or satisfies a certain condition (e.g., when the presence of a gas is detected) as defined by the programming of the wireless control device 30, control device 30 may complete an action in response. In other embodiments, probe 10 stores data in memory device 17 until the data exceeds a certain threshold or satisfies a certain condition stored in memory device 17. Once the threshold is exceeded or satisfied, probe 10 transmits the data to wireless control device 30 and control device 30 may complete an action in response. In various embodiments, the action completed in response by wireless control device 30 may include transmitting a control signal to modify an operating condition of food equipment 20 (e.g., increasing or decreasing the cook temperature of food equipment) or displaying an alert to a user.

Figure 4:
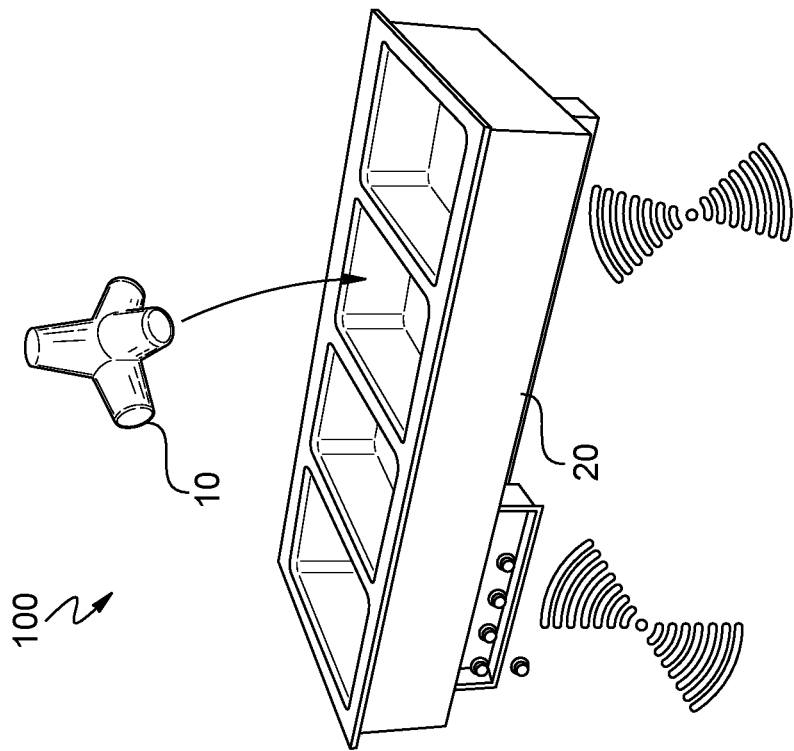
FIGS. 3-4 are perspective views of the wireless probe food preparation system of FIG. 1 including a steam table apparatus, according to exemplary embodiments.
Figure 3:
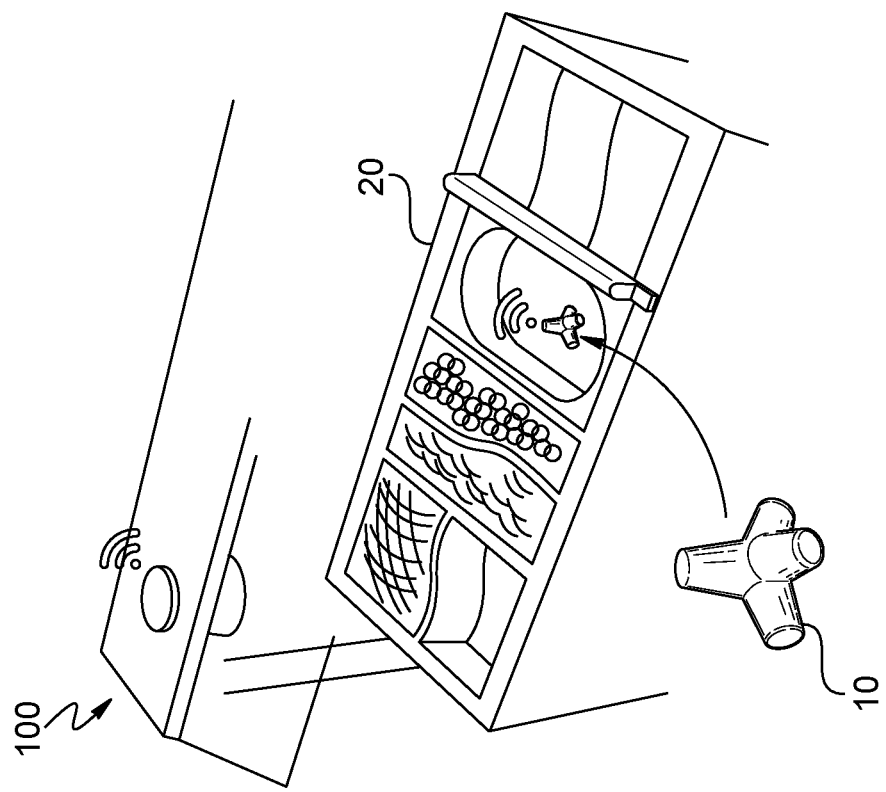

Referring now to FIGS. 3-4, views of system 100 including steaming tables are depicted, according to alternate exemplary embodiments. As described above, wireless probe 10 may include an RFID chip (e.g., wireless transmitter device 19) configured to be paired with tray openings contained in steaming tables 20. For example, when a tray containing foodstuff with an immersed wireless probe 10 is placed in one of the tray openings of steam table 20, wireless transmitter 22 may communicate with an RFID receiver device located in the tray opening to initiate a heating process localized to the particular tray opening. In other embodiments, probe 10 may transmit temperature data to wireless control device 30, and control device 30 may transmit heating commands to steaming table 20.

Figure 5:
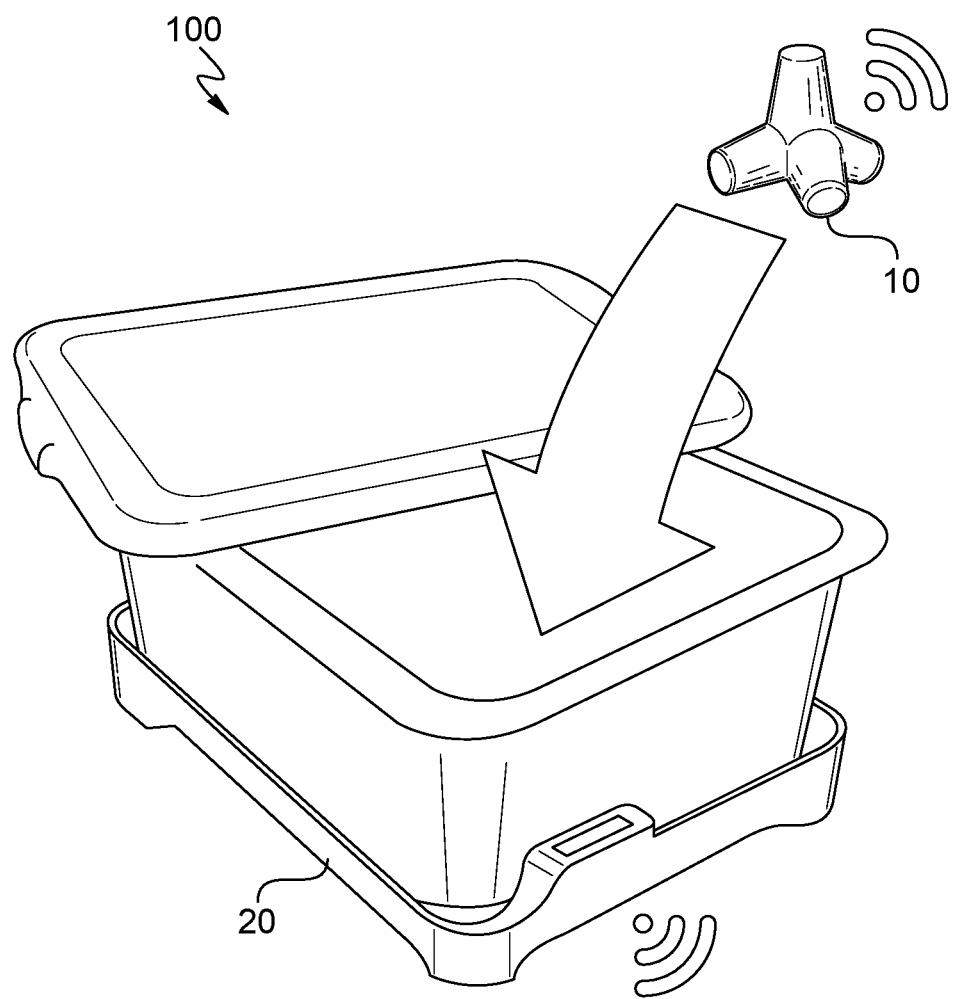
FIG. 5 is a perspective view of the wireless probe food preparation system of FIG. 1 including a food storage container, according to an exemplary embodiment.

Turning now to FIG. 5, a view of system 100 including food equipment 20 in the form of a food storage container is depicted, according to an alternate exemplary embodiment. As described above, food equipment 20 may include any apparatus or device related to a process involving food, including a food storage container. In an exemplary embodiment, wireless probe 10 is placed with the foodstuff within the food storage container 20. In some embodiments, the food storage container may be color coded according to hazard analysis critical control point (HACCP) colors (e.g., red for raw meat, green for produce, etc.) and wireless probe 10 may be configured to store and transmit data used to ensure compliance with HACCP protocols.

Figure 6:
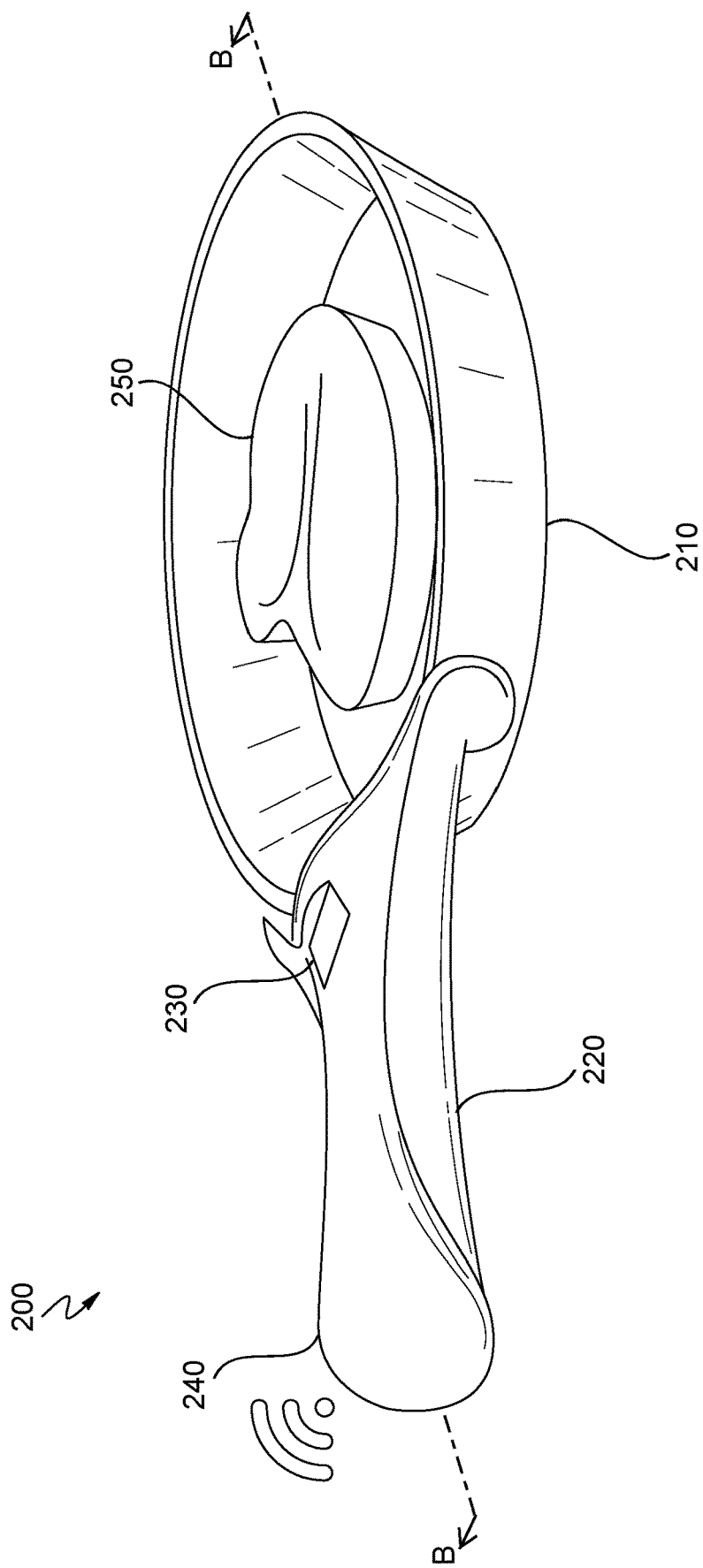
FIG. 6 is a perspective view of a cooking appliance with a removable temperature-sensing handle, according to an exemplary embodiment.

Referring now to FIG. 6, a view of a cooking appliance 200 with a removable temperature-sensing handle is shown. According to an exemplary embodiment, cooking appliance 200 includes a cooking vessel 210 and a removable temperature-sensing handle portion 220. Removable temperature-sensing handle portion 220 may be detachably coupled to cooking vessel 210 via any suitable means (e.g., fasteners, a "clip on-clip off" system). Cooking appliance 200 may be configured to convey heat to a foodstuff 250 during a cooking process, and cooking vessel 210 may be any type of vessel suitable to retain the foodstuff 250 during the cooking process. For example, in various embodiments, cooking vessel 210 may be a frying pan, a sauce pan, a stock pot, a skillet, a griddle, a sauté pan, a grill pan, or a wok. In some embodiments, cooking vessel 210 includes a handle, and removable temperature-sensing handle portion 220 is configured to be secured over the handle of cooking vessel 210 (see FIGS. 8-9 below). In other embodiments, cooking vessel 210 does not include a handle, and handle portion 220 may be configured to interface with multiple cooking vessels 210. In this way, a user is able to detach the handle portion 220 and wash the cooking vessel 210 without potentially damaging the electronics of the handle portion 220.

Removable temperature-sensing handle portion 220 includes a display screen 230 and a wireless transmitting end 240. Display screen 230 may be any suitable type of display screen (e.g., LCD display, LED display, etc.) configured to display data related to the cooking process of foodstuff 250. For example, in various embodiments, display screen 230 may display properties including, but not limited to, a temperature of the foodstuff 250, a temperature of the cooking vessel 210, a time elapsed in the cooking of foodstuff 250, and an estimated time to completion of cooking foodstuff 250. Wireless transmitting end 240 may be configured to emit wireless signals generated by a wireless transmitter (e.g., wireless transmitting device 242, described below with reference to FIG. 7). In various embodiments, the wireless signals may be received by a wireless control device or cooking equipment. Wireless transmitting end 240 may transmit data collected by temperature-sensing handle portion 220 on a continuous basis or at discrete intervals (e.g., when a threshold is exceeded or a condition is satisfied).

Figure 7:
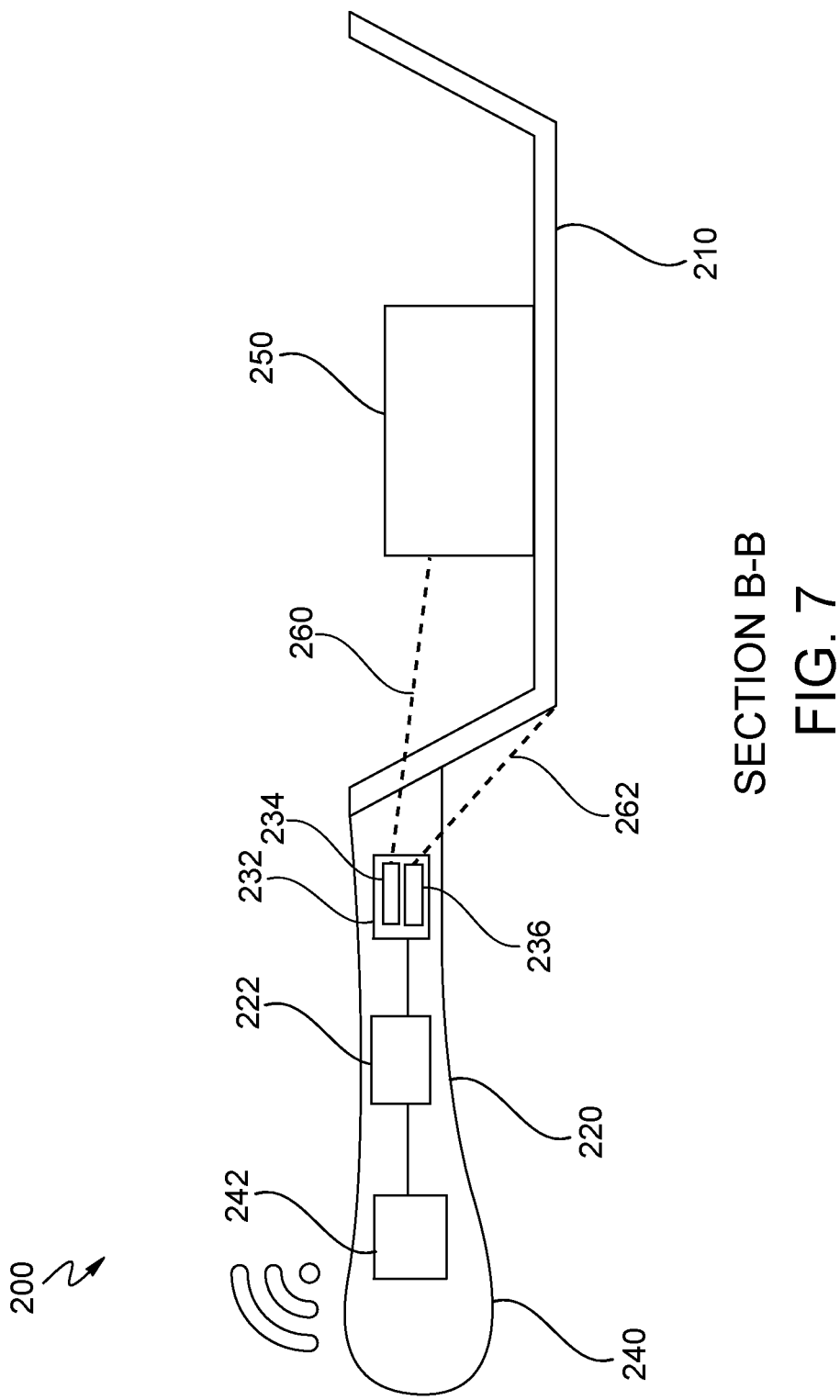
FIG. 7 is a sectional view of the cooking appliance of FIG. 6, according to an exemplary embodiment.

FIG. 7 depicts a sectional view of cooking appliance 200, according to an exemplary embodiment. As shown, cooking appliance 200 is configured to convey heat to a foodstuff 250 during a cooking process and includes cooking vessel 210 and removable temperature-sensing handle portion 220. Removable temperature-sensing handle portion 220 is shown to include a memory device 222, a temperature sensing unit 232, and a wireless transmitter device 242. Memory device 222 may be configured to store data collected by temperature sensing unit 232. Wireless transmitter device 242 may be configured to transmit the data collected by temperature sensing unit 232 and stored by memory device 222 to a receiver, a receiver within cooking equipment, a mobile device, or cloud gateway via any suitable wireless means (e.g., Bluetooth protocols, RFID, near field communication). In some embodiments, memory device 222 and wireless transmitter device 242 are identical or substantially similar to memory device 17 and wireless transmitter device 19, described above with reference to FIG. 2.

Temperature sensing unit 232 is shown to include a first infrared sensor 234 and a second infrared sensor 236. Infrared sensors 234 and 236 may consist of a lens configured to focus the infrared energy emitted by an object onto one or more photodetectors, which convert the energy to an electrical signal. Because the emitted infrared energy of an object is proportional to its temperature, the electrical signal provides an accurate reading of the temperature of the object that the sensor is pointed towards. For example, target line 260 indicates that first infrared sensor 234 is configured to measure the temperature of foodstuff 250, while target line 262 indicates that second infrared sensor 236 is configured to simultaneously measure the temperature of cooking vessel 210. In various embodiments, temperature sensing unit 232 includes additional sensors configured to measure other properties (e.g., time elapsed in cooking, weight of foodstuff 250, viscosity of foodstuff 250) related to the cooking process. In still further embodiments, temperature sensing unit 232 may include additional infrared sensors or non-infrared temperature sensors.

Referring now to FIGS. 8-9, views of an assembly procedure for cooking appliance 200 are shown, according to an exemplary embodiment. As described above, cooking vessel 210 may include a receptacle, an existing (fixed) handle and a removable temperature-sensing handle portion 220 that may be configured to fit over the existing (fixed) handle 270 and detachably couple to the cooking vessel 210 (e.g., the fixed handle, the receptacle, both, etc.). In some embodiments, the geometry of the existing handle 270 may affect the target locations of the infrared sensors of the temperature sensing unit 232. For example, as shown in FIG. 9, target line 260 of the first infrared sensor 234 may measure the temperature of the foodstuff contained within cooking vessel 210, while targets 262 of the second infrared sensor 236 may simultaneously measure the temperature of the cooking vessel 210 at the points at which cooking vessel 210 is coupled to temperature-sensing handle portion 220. If the temperature of the cooking vessel 210 or the foodstuff 250 is measured at multiple locations, the sensor readings may be combined to form a mean temperature reading via an appropriate statistical method, and/or adjusted to proximate the desired temperature location (e.g., adjusting the sensed temperature of the sidewall of the vessel 210 to reflect the actual temperature of the cooking surface). According to an alternative embodiment, the temperature of the existing handle 270 is detected (e.g., by thermocouple or otherwise, rather than infrared sensing the vessel 210), and the temperature of the cooking surface is calculated.

Figure 10:
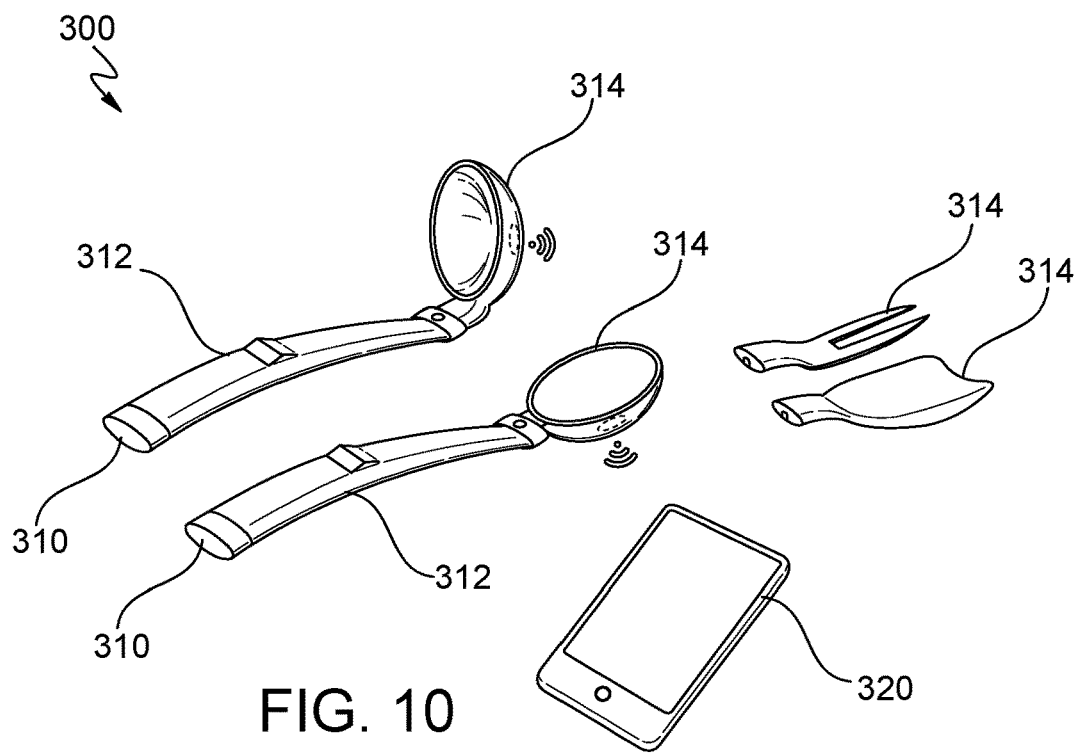
FIGS. 10-11 are perspective views of a wireless food-sensing utensil system, according to exemplary embodiments.
Figure 11:
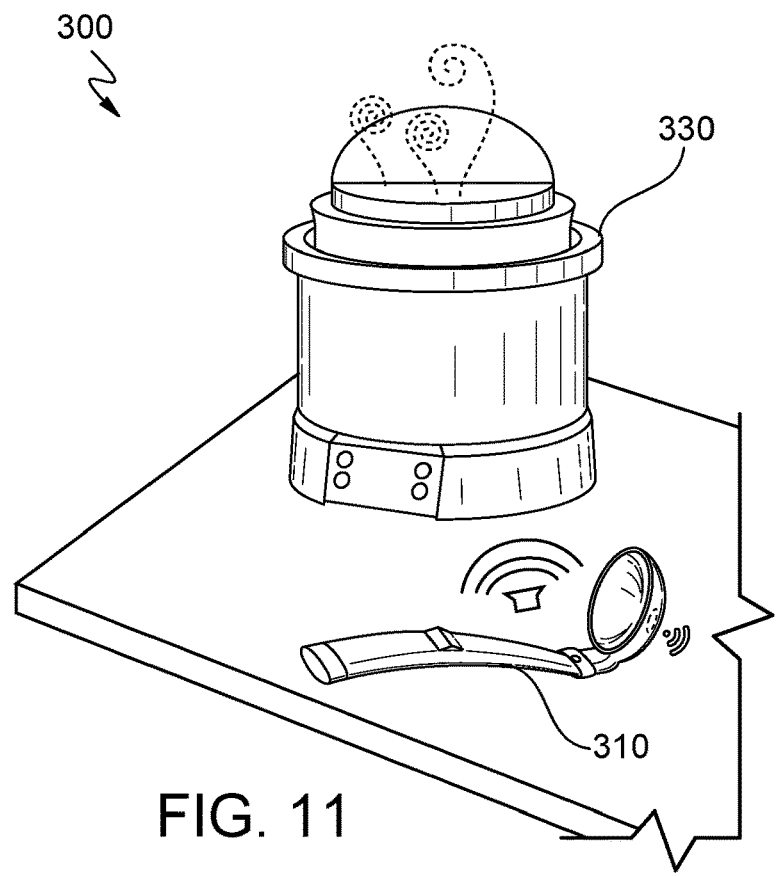

Turning now to FIGS. 10-11, another embodiment of the invention in a wireless food-sensing utensil system 300 is shown. Utensil system 300 is shown to include food utensil 310, wireless control device 320, and food equipment 330. Food utensil 310 may be utilized in any portion of a food preparation, rethermalization, storage, transportation, or service process and is shown to include a handle portion 312 and a sensing utensil portion 314. The handle portion 312 may be detachably coupled to the sensing utensil portion 314 such that the handle portion 312 and the sensing utensil portion 314 are interchangeable. In some embodiments, handle portion 312 includes a display screen configured to display data related to the food that is retained or otherwise in contact with sensing utensil portion 314.

In various embodiments, sensing utensil portion 314 may have the form of a spoon, a scoop, a fork, a ladle, a skewer, a spatula, a brush, a whisk, a server, or a turner. Sensing utensil portion 314 may include one or more various sensors, memory units, and wireless transmitter devices similar to those described above with reference to FIGS. 2 and 7. In some embodiments, sensing utensil portion 314 may be configured to detect properties related to the food in contact with utensil 310 other than temperature. For example, these properties may include cooking time, the presence of allergens with the food, and the weight, volume, level, or portions of food within food equipment 330. In other embodiments, food utensil 310 may include an audible or visual indicator configured to alert a user to the presence of a certain condition. For example, if sensing utensil portion 314 comes into contact with an allergen (e.g., peanuts), food utensil 310 may emit a beeping noise or an indicator light may flash red to indicate the presence of the allergen. As another example, utensil 310 may be configured to detect when utensil 310 has been removed from a certain vicinity of food equipment 330 (e.g., temperature drop, orientation, etc.) and may emit a beeping noise to prompt a user to replace the utensil 310 within the food equipment 330 (e.g., to ensure continuous monitoring). According to another embodiment, the handle portion 312 may include an additional sensor to detect the temperature of the vessel containing the food. For example, the handle portion 312 may have an infrared sensor that would be directed to the food vessel when the utensil is in its stored position. Alternatively, the handle portion 312 may have a contact sensor that touches the food vessel when the utensil is in its stored position (e.g., outer surface, built into a hook or notch that engages the food vessel, etc.).

Food utensil 310 may be configured to communicate with wireless control device 320 and/or food equipment 330 via wireless signals emitted from a wireless transmitter device embedded in sensing utensil portion 314. In various embodiments, wireless control device 320 is a mobile device (e.g., a smartphone, a tablet). In other embodiments, wireless control device 320 is a receiver unit specifically configured to control a particular type of food equipment 330, or a website configured to act as a gateway to a remote data storage facility (i.e., a cloud service). Food equipment 330 may include any piece of cooking equipment and may include, but is not limited to, a soup kettle, an induction cooker, an induction range, a steam table or tray, a chafing dish, or a food storage container. Based on the wireless messages emitted by food utensil 310, wireless control device 320 and/or food equipment 330 may modify a cooking process and/or alert a user to a condition of the foodstuff during the cooking process. For example, if temperature data detected by food utensil 310 indicates that a foodstuff in contact with utensil 310 has exceeded a certain threshold temperature, control device 320 may transmit a signal to food equipment 330 to reduce the cooking temperature of the food accordingly. As another example, if food utensil 310 indicates that a certain number of portions have been served from food equipment 330, wireless control device 320 may display a message to a user indicating the need to refill the food equipment 330.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A probe used with food preparation, rethermalization, storage, transportation, and/or service, the probe comprising:
   a body configured to be fully immersed in a foodstuff, the body comprising a plurality of arms;
   a plurality of sensors located within the body and configured to collect data including the temperature of the foodstuff, wherein at least one of the plurality of sensors is positioned within each of the plurality of arms; and
   a wireless transmitter located within the body and configured to transmit data collected by the one or more sensors to food equipment to control the heat provided to the foodstuff while the body, the plurality of sensors, and the wireless transmitter are fully immersed in the foodstuff.

2. The probe of claim 1, wherein the body includes a hub and the plurality of arms extend from the hub.

3. The probe of claim 1, wherein a first arm of the plurality of arms comprises a first sensor of the plurality of sensors, the first sensor configured to measure the temperature of the foodstuff; and
   wherein a second arm of the plurality of arms comprises a second sensor of the plurality of sensors, the second sensor configured to measure a property other than temperature.

4. The probe of claim 1, further comprising memory configured to store data collected by the one or more sensors.

5. The probe of claim 1, wherein the one or more sensors is further configured to measure at least one of: an amount of time elapsed in a food preparation process, a weight of the foodstuff, a viscosity of the foodstuff, a level of foodstuff contained in the food equipment, and a humidity.

6. The probe of claim 1, wherein the one or more sensors is further configured to detect at least one of: a probe location, and a gas composition.

7. The probe of claim 1, wherein the wireless device operates using a Bluetooth protocol.

8. The probe of claim 1, wherein the wireless device is an RFID chip.

9. The probe of claim 1, wherein the food equipment is an induction cooker, a steam table, or a food storage container.

10. The probe of claim 1, wherein the wireless device is further configured to transmit data collected by the one or more sensors to a wireless control device to control the heat provided to the foodstuff.

11. The probe of claim 10, wherein the wireless control device is a smartphone or a tablet.

* * * * *